US008343329B2

(12) United States Patent  
Shirakura et al.

(10) Patent No.: US 8,343,329 B2  
(45) Date of Patent: Jan. 1, 2013

(54) ELECTRODE FOR HYDROGEN GENERATION, METHOD FOR MANUFACTURING THE SAME AND ELECTROLYSIS METHOD USING THE SAME

(75) Inventors: Yoshinori Shirakura, Shunan (JP); Akinori Shimono, Shunan (JP)

(73) Assignee: Tosoh Corporation, Shunan-shi, Yamaguchi-ken (JP)

( * ) Notice: Subject to any disclaimer, the term of this patent is extended or adjusted under 35 U.S.C. 154(b) by 1360 days.

(21) Appl. No.: 11/578,717

(22) PCT Filed: Oct. 25, 2004

(86) PCT No.: PCT/JP2004/015797  
§ 371 (c)(1),  
(2), (4) Date: Oct. 18, 2006

(87) PCT Pub. No.: WO2005/103337  
PCT Pub. Date: Nov. 3, 2005

(65) Prior Publication Data  
US 2008/0029396 A1    Feb. 7, 2008

(30) Foreign Application Priority Data  
Apr. 23, 2004  (JP) ................. P2004-128129

(51) Int. Cl.  
*C25B 11/08* (2006.01)
(52) U.S. Cl. .......... 205/637; 204/290.14; 204/293; 205/620; 205/632; 502/326; 502/330
(58) Field of Classification Search ........... 204/293, 204/290.14; 205/620, 632, 637; 502/326, 502/330  
See application file for complete search history.

(56) References Cited

U.S. PATENT DOCUMENTS  
4,238,311 A    12/1980  Kasuya  
(Continued)

FOREIGN PATENT DOCUMENTS  
DE           100 07 448 A    8/2000  
(Continued)

OTHER PUBLICATIONS  
International Search Report of PCT/JP2004/015797, mailed Dec. 14, 2004.  
(Continued)

*Primary Examiner* — Nicholas A. Smith  
(74) *Attorney, Agent, or Firm* — Nixon & Vanderhye P.C.

(57) ABSTRACT

The present invention provides an electrode for hydrogen generation of which the hydrogen overvoltage is sufficiently low and which is not affected by poisoning due to iron ions, and furthermore, of which the durability is superior because during operations and stop-and-start control, the hydrogen overvoltage does not rise and exfoliation of the supported material does not occur. The present invention also provides a method for manufacturing the aforementioned hydrogen generation electrode and an electrolysis method using the electrode for hydrogen generation as a cathode. An electrode for hydrogen generation is used in which a platinum alloy including platinum and one metal selected from the group consisting of nickel, cobalt, copper, silver, and iron, or an amorphous material of a transition metal element and platinum is supported on a conductive base material. This electrode is obtained by coating a metal compound solution including one selected from the group consisting of nickel, cobalt, copper, silver, and iron, and a platinum compound solution which forms an ammine complex; drying; thermally decomposing at a temperature in a range from more than 200° C. to 700° C. or less; and then subjecting to a reduction processing.

14 Claims, 3 Drawing Sheets

U.S. PATENT DOCUMENTS

| | | | |
|---|---|---|---|
| 4,294,628 A | 10/1981 | Kasuya | |
| 4,414,071 A | 11/1983 | Cameron et al. | |
| 4,465,580 A * | 8/1984 | Kasuya | 204/290.12 |
| 4,572,770 A | 2/1986 | Beaver et al. | |
| 4,584,085 A | 4/1986 | Beaver et al. | |
| 4,760,041 A | 7/1988 | Beaver et al. | |
| 4,784,730 A | 11/1988 | Willis et al. | |
| 4,794,054 A | 12/1988 | Ito et al. | |
| 4,802,962 A | 2/1989 | Cairns | |
| 5,944,966 A | 8/1999 | Suetsugu et al. | |
| 5,948,223 A | 9/1999 | Horikoshi et al. | |
| 6,312,571 B1 | 11/2001 | Nara et al. | |
| 6,326,098 B1 * | 12/2001 | Itoh et al. | 429/40 |
| 7,311,946 B2 * | 12/2007 | Garg et al. | 427/404 |
| 7,485,390 B2 * | 2/2009 | Devenney et al. | 429/524 |
| 2004/0151896 A1 * | 8/2004 | Houda et al. | 428/327 |
| 2006/0260955 A1 * | 11/2006 | Sasaki et al. | 205/759 |
| 2007/0010396 A1 * | 1/2007 | Giaquinta et al. | 502/345 |

FOREIGN PATENT DOCUMENTS

| | | |
|---|---|---|
| GB | 2 185 347 A | 7/1987 |
| JP | 40-9130 | 5/1940 |
| JP | 54-110984 | 8/1979 |
| JP | 57-23083 | 2/1982 |
| JP | 57-023083 | 2/1982 |
| JP | 59-25985 | 2/1984 |
| JP | 59-232284 | 12/1984 |
| JP | 60-17085 | 1/1985 |
| JP | 60-56082 | 4/1985 |
| JP | 60-59090 | 4/1985 |
| JP | 63-72897 | 4/1988 |
| JP | 64-8288 | 1/1989 |
| JP | 9-206597 | 8/1997 |
| JP | 2000-239882 | 9/2000 |
| JP | 3319370 | 6/2002 |
| JP | 3358465 | 10/2002 |

OTHER PUBLICATIONS

Nagasaki et al.; "Binary Alloy Phase Diagram Collection", Agune Gijyutsu Center Publishing, Second Edition, pp. 13, 112, 136, 152, 230, 212 and 205 w/English language abstract, Jul. 25, 2002.

Chemistry Handbook Fundamental Volume Revised Second Edition (author Association of the Chemical Society of Japan, published by Maruzen Ltd.); Table 11.169 (general values of interatomic distances), pp. 1401-1403, May 20, 1977 second printing w/English Abstract of Table 11.169.

Electrochemical Handbook, Fifth Edition, Maruzen Publishing, pp. 92-95 w/English language Abstract, 2000.

* cited by examiner

COMPARATIVE EXAMPLE 9

ELECTRODE FOR HYDROGEN GENERATION, METHOD FOR MANUFACTURING THE SAME AND ELECTROLYSIS METHOD USING THE SAME

This application is the U.S. national phase of international application PCT/JP2004/015797, filed 25 Oct. 2004, which designated the U.S. and claims priority of JP 2004-128129, filed 23 Apr. 2004, the entire contents of each of which are hereby incorporated by reference.

TECHNICAL FIELD

The present invention relates to an electrode for hydrogen generation that is utilized in the electrolysis of water, or in the electrolysis of alkali metal chloride aqueous solutions such as sodium chloride, a method for manufacturing the same, and an electrolysis method using the same.

BACKGROUND ART

Industries of water electrolysis or alkali metal chloride aqueous solution electrolysis are heavy power-consuming type industries, and a variety of technology developments are being performed for energy saving. The method for saving energy thereof involves substantially reducing the electrolysis voltage which includes the theoretical decomposition voltage, the solution resistance, the ion-exchange membrane resistance, the anode overvoltage, the cathode overvoltage, and the like.

In particular, in relation to reducing the overvoltage, since the overvoltage value thereof is influenced by the catalyst material of the electrode, the morphology of the electrode surface, or the like, much research and development has been previously performed regarding the improvement thereof. With regard to an ion-exchange membrane process for sodium chloride electrolysis, as a result of active research and development being performed on the reduction of the anode overvoltage, dimensionally stable electrodes with low anode overvoltages and excellent durabilities (for example, the DSE electrode (registered trademark) manufactured by Permelec Electrode Co.) were completed, and these are already being utilized in a wide range of fields, including the sodium chloride electrolysis industry.

On the other hand, there have also previously been many propositions in relation to electrodes for hydrogen generation, or so-called activated cathodes, for reducing the cathode overvoltage (for example, Patent Document 1).

Generally, a means for decreasing the hydrogen overvoltage represents an increase in activity of a supported catalyst and an increase in the reactive specific surface area. For improving the activity, a high activity catalyst of a metallic compound, a metallic alloy, an oxide, or compounds thereof which has a specific composition is supported on a conductive base material, and the increase in specific surface area is improved as a result of the support method thereof. Examples of the main support methods include: the electroplating method that electrodeposits the catalyst component from the vessel in which the active component and the metal salt has been dissolved; the dispersal plating method that electrodeposits the catalyst component by electrophoresis from the vessel in which the active material has been dispersed in a metal salt solution; the spray coating method that thermally sprays the melt state catalyst material directly onto a base material; and the thermal decomposition method that coats and bakes a metal salt solution and the like.

Conventionally, as an electrode that can decrease the hydrogen overvoltage of an iron cathode of approximately 400 mV to 150 to 200 mV, for example, a method has been disclosed in which an alloy layer of a transition metal of iron, cobalt, and nickel and one of tungsten and molybdenum is supported on the surface of a conductive base material by the electroplating method (Patent Document 1).

Furthermore, an electrode has been disclosed that supports a material containing, in addition to a combination of nickel and one of iron, cobalt, and indium, an organic compound such as an amino acid, a carboxylic acid, or an amine, on the surface of the conductive base material by the electroplating method (Patent Document 2).

However, in these electrodes, since it is necessary to make the supported material very thick, it is easy for distortions of the electrode and peeling of the supported material to occur as a result of the plating stress. Also the activity of these base metals are low. Therefore, the improvement of the activity by alloying the base metals alone was insufficient as an effect that decreases the hydrogen overvoltage.

Furthermore, an electrode in which an alloy layer containing nickel and molybdenum is supported by the arc ion plating method has been disclosed (Patent Document 3); however, despite the initial hydrogen overvoltage being sufficiently low, there was a problem in the hydrogen overvoltage rising during long electrolysis operations, or the so-called durability.

On the other hand, an electrode for hydrogen generation has been disclosed which includes a three-component alloy consisting of: nickel and/or cobalt; a component selected from aluminum, zinc, magnesium, and silicon; and a noble metal such as platinum (Patent Document 4).

This electrode is disclosed for the purpose in which the component selected from aluminum, zinc, magnesium, and silicon is eluted and removed from the alloy including the aforementioned three components and a Raney nickel and/or Raney cobalt catalyst is utilized in the electrode for hydrogen generation. As a result of the addition of the noble metal component at a minute amount of less than 0.4 by mole ratio, the deterioration of the electrode activity due to the decomposition of nickel and/or cobalt to nickel hydroxide or cobalt hydroxide is prevented; thereby, the improvement in durability is achieved.

However, since in this electrode, the hydrogen overvoltage is reduced by increasing the specific surface area of the nickel and/or cobalt, as well as a process that removes components from the catalyst being necessary, it is necessary to thicken the supported material to several tens of microns to several hundreds of microns. Therefore, there were problems such as the production costs being very high. In Patent Document 4, it is disclosed that there is no reduction effect in the hydrogen generation overvoltage, even when the amount of the noble metal component was set to be 0.4 or more by mole ratio.

Furthermore, electrodes for hydrogen generation have been conventionally proposed which include a mixture of Ni or a Ni alloy and a platinum group metal and the like. For example, in Patent Document 5, an electrode for hydrogen generation including at least one cathode active material selected from among platinum group metals and/or platinum group metal oxides which is dispersed in Ni or a Ni alloy, that is to say, an electrode for hydrogen generation has been proposed in which a mixture of Ni or a Ni alloy and at least one cathode active material selected from among platinum group metals and/or platinum group metal oxides is coated.

As an active nickel coating which mainly contains Ni or an alloy thereof, an active material is selected from a porous nickel which is obtained by coating Ni and a sacrificial metal and then eluting the sacrificial metal, and an alloy and/or a mixture which includes Ni and other metal and/or other compound. On the other hand, as other metals that are coated together with Ni, many materials have been proposed such as Fe, Mo, Co, W, Al, Zn, Sn, Mg, Ti, platinum group metals, and their oxides.

In Patent Document 5, as an electrode for hydrogen generation with a particularly low hydrogen overvoltage and an excellent durability, a coating has been exemplified that contains active nickel in which platinum group metal particles or platinum group oxide particles such as platinum black, ruthenium black, ruthenium oxide, and the like are mixed and dispersed in Ni.

However, as is disclosed in the Examples of Patent Document 5, with regard to an electrode for hydrogen generation including Ni containing ruthenium oxide particles which is one of the most superior examples mentioned above, even in the case in which the current density is low such as 0.20 A/cm$^2$ (2 kA/m$^2$), the hydrogen generation potential is −0.98 V vs. NHE. When this value is converted to a hydrogen overvoltage, it is approximately 120 mV, and the hydrogen overvoltage performance is insufficient. That is to say, each of the electrodes for hydrogen generation proposed in Patent Document 5 which are achieved by coating various metals or the oxides thereof such as a platinum group metal together with Ni or a Ni alloy were not satisfactory in the overvoltage performance.

In addition, mixtures and complexes of platinum group metal oxides and oxides of Ni and the like has been conventionally proposed to use. For example, in Patent Document 6, a method for producing an electrode which includes a mixed oxide or a complex oxide containing a platinum group metal oxide and a Ni oxide has been proposed. In the method, the mixed solution of the platinum group metal compound and metal compound of Ni and the like are coated and dried, and then a heat treatment is conducted under sufficient conditions for oxidizing the metal compound, that is to say, a heat treatment under an oxidizing flow of air or oxygen and at a high temperature.

In Example 3 of Patent Document 6, an electrode for hydrogen generation is disclosed in which oxides of platinum, nickel, and ruthenium coated, and the electrode is produced by coating a mixed solution of chloroplatinic acid, nickel chloride, and ruthenium chloride on a nickel base material and drying the solution, and then subjecting to a thermal decomposition at 470 to 480° C. The potentials measured at 0.31 A/cm$^2$ (3.1 kA/m$^2$) are disclosed in Ex. 3 of Table I. When the potentials are converted into overvoltages using the actual absolute reversible voltages in the thermodynamic calculations disclosed in Patent Document 6, the overvoltage of the first cycle is 42 mV which is sufficiently satisfactory; however, the overvoltage rises together with the electrolysis progress, and the hydrogen generation overvoltage of the sixth cycle is 87 mV, and the hydrogen generation overvoltages of the eleventh or more cycles are 97 mV. Accordingly, in the case in which a current density of 5 kA/m$^2$ or more is applied, the overvoltage is predicted to be 100 mV or more at the very lowest. Therefore, there was a problem that should be improved.

On the other hand, in addition to the above, electrodes for hydrogen generation have been conventionally proposed in which a plurality of noble metal group elements and base metal elements have been combined. For example, in Patent Document 7, electrodes for hydrogen generation has been proposed in which a noble metal precipitate containing one noble metal or a mixture or an alloy of two or three or more of noble metals, or a precipitate containing the above-mentioned noble metal precipitate and one or two or more of base metals such as Ni is deposited onto a conductive base material of Ni and the like.

However, with regard to these electrodes for hydrogen generation, it is known that they possess a problem in that they are susceptible to poisoning as a result of impurities such as iron in the electrolyte (Patent Document 8 and Patent Document 9).

In this manner, electrodes for hydrogen generation which support platinum and have a low overvoltage have been conventionally proposed. However, electrodes for hydrogen generation which support platinum are sensitively susceptible to the effects of poisoning due to small amounts of iron ions which are present in the electrolyte, and even when the iron ion concentration is a trace concentration of 1 ppm or less, the hydrogen overvoltage rises. Consequently, further improvements are being examined in regard to the utilization in the electrolysis industry of alkali metal chloride aqueous solutions and the like in which iron ions tend to be mixed into the electrolyte (Patent Document 8).

Accordingly, wide examinations are being performed for the purpose of preventing poisoning due to iron ions in the electrolyte, and a variety of propositions have been performed.

The applicant has previously investigated the relationship between the precipitation of iron on the cathode and the iron ions in the catholyte in the case in which a hydrogen generation cathode having a low hydrogen overvoltage is used for the electrolysis of an alkali metal chloride aqueous solution. The applicant has found that the precipitation of iron can be prevented in the case in which the iron ion concentration in the catholyte is 0.5 ppm or less. Then, a method for electrolyzing an alkali metal chloride aqueous solution was proposed in which a low hydrogen overvoltage cathode is used, and the electrolysis is performed while maintaining the iron ion concentration in the catholyte to 0.5 ppm or less (Patent Document 9).

As a result of such an invention, the electrodes for hydrogen generation which sensitively receive the effects of poisoning due to iron ions can be utilized in the electrolysis industry of the alkali metal chloride aqueous solution and the like. However, in order to execute the proposition of Patent Document 9, it is necessary to use a material such as high Ni type stainless or Ni in at least areas that are anodically polarized amongst portions that make contact with the catholyte, and is also necessary to flow an anticorrosion current at the time when the electrolysis is stopped. Therefore there were problems to be improved upon from an economic viewpoint.

Furthermore, a method was examined for removing iron from an electrode for hydrogen generation in which the overvoltage has risen as a result of the iron ions, and propositions have been performed in which the iron is removed from an electrode for hydrogen generation that has a deteriorated hydrogen overvoltage due to the precipitation of iron, and the electrode is reused.

For example, a method for removing iron that has been precipitated on the cathode surface was proposed which includes bringing the cathode surface into contact with a liquid medium that reacts with the iron precipitated on the surface thereof and solubilizes the same (Patent Document 10).

As a result of using this method, electrodes for hydrogen generation in which the overvoltage has risen due to the iron ions can be reused; however, in order to execute this proposition, there was a need to frequently stop electrolysis, and it was not possible to stably operate for continuous long periods. Accordingly, in this case, there were also problems to be improved upon from an economic viewpoint.

Furthermore, attempts have been conventionally widely performed to impart characteristics in which iron ions are hard to adhere to the electrode for hydrogen generation itself, or the performance does not deteriorate even when iron ions adhere.

For example, electrodes for hydrogen generation were proposed which support a catalyst containing platinum, ruthenium, and at least one of gold and silver, or a catalyst that further contains particles of an organic polymer on a conductive base material (Patent Document 11).

With regard to the aforementioned electrode for hydrogen generation, the rise in the overvoltage is very small even when iron ions are present in the catholyte, and it is an electrode for hydrogen generation that certainly possesses excellent characteristics in regard to reducing the energy consumption of electrolysis of alkali metal chloride aqueous solutions.

However, platinum, ruthenium, gold, and silver are all expensive materials, and in the case in which polytetrafluoroethylene is included in the electrode for hydrogen generation, it becomes even more expensive. Accordingly, in this case, there were also problems to be improved upon from an economic viewpoint.

On the other hand, an electrode for hydrogen generation has been proposed in which a catalyst including platinum and cerium oxide is used (Patent Document 12).

With regard to the electrode for hydrogen generation including this platinum and cerium oxide catalyst, the overvoltage is low, the effect of iron ions is restricted, and it exhibits excellent characteristics as an electrode for hydrogen generation for electrolysis of alkali metal chloride aqueous solutions.

Furthermore, a proposition has been performed in which an intermediate layer including a nickel oxide is provided between the catalyst containing platinum and cerium oxide and a base material (Patent Document 12), and examinations are being performed in order to further improve cost problems and the like.

As described above, various electrodes for hydrogen generation and methods for utilizing the electrodes for hydrogen generation have been conventionally proposed for the purpose of reducing the power consumption of the electrolysis of water or alkali metal chloride aqueous solution. However, with regard to the conventional electrodes for hydrogen generation, an electrode for hydrogen generation has not still been obtained which satisfies both of the hydrogen overvoltage characteristic, the resistance characteristic to poisoning due to iron ions in the catholyte, together with a sufficient durability in the industrial utilization in which stop-and-start control is conducted, and industrially satisfactory characteristics.

Patent Document 1: Japanese Examined Patent Application, Second Publication No. Sho 40-9130

Patent Document 2: Japanese Patent Publication No. 3319370 (Examples)

Patent Document 3: Japanese Patent Publication No. 3358465 (Examples)

Patent Document 4: Japanese Unexamined Patent Application, First Publication No. Sho 59-25985 (Claims, from line 13 in the upper right column on page 2, to line 16 in the lower right column on page 2, Examples)

Patent Document 5: Japanese Unexamined Patent Application, First Publication No. Sho 54-110984 (lines 10 to 16 in the upper left column on page 3, from line 17 to the last line in the lower left column on page 3)

Patent Document 6: Japanese Unexamined Patent Application, First Publication No. Sho 59-232284 (claim 3, from line 10 in the lower left column on page 6, to line 5 in the lower right column on page 6, from line 4 in the lower right column on page 7, to line 19 in the lower right column on page 10, Examples)

Patent Document 7: Japanese Unexamined Patent Application, First Publication No. Sho 57-23083 (Claims, from line 17 in the lower left column on page 4, to line 9 in the lower right column on page 4)

Patent Document 8: Japanese Unexamined Patent Application, First Publication No. Sho 64-8288 (Claims, from line 15 to the last line in the lower left column on page 2)

Patent Document 9: Japanese Unexamined Patent Application, First Publication No. Sho 60-56082 (Claims, from line 19 in the upper left column on page 2, to line 16 in the lower left column on page 2, from line 18 in the upper left column on page 3, to line 4 in the lower left column on page 3)

Patent Document 10: Japanese Unexamined Patent Application, First Publication No. Sho 60-59090 (Claims)

Patent Document 11: Japanese Unexamined Patent Application, First Publication No. Sho 63-72897 (Claims)

Patent Document 12: Japanese Unexamined Patent Application, First Publication No. 2000-239882 (Claims, paragraph 0004, paragraph 0006)

DISCLOSURE OF THE INVENTION

Problems to be Solved by the Invention

An object of the present invention is to provide an electrode for hydrogen generation which can be utilized in the electrolysis industries of water or alkali metal chloride aqueous solution. The hydrogen overvoltage thereof is sufficiently low and the electrode is not affected by poisoning due to iron ions, and furthermore, the durability thereof is superior in that the hydrogen overvoltage does not rise during stop-and-start control and the supported material does not fall off. Also the present invention provides a method for manufacturing the aforementioned hydrogen generation electrode and an electrolysis method using the electrode for hydrogen generation as a cathode. The present invention is for the purpose of reducing the energy consumption of electrolysis of water or alkali metal chloride aqueous solution.

Means for Solving the Problems

The present inventors have investigated in order to solve the above-mentioned problems; thereby, they have found that if the method for supporting the catalyst on the conductive base material is different, the existing state of the atoms (mixture, alloy, or complex oxide) within the catalyst is different. Furthermore, it has been found that even in the case in which the types of atoms used in the catalyst are the same, if the composition or the state of atoms is different, the characteristics of the electrode for hydrogen generation becomes greatly different.

Based on these findings, further investigation regarding the electrodes for hydrogen generation has been performed, and an electrode for hydrogen generation which includes a conductive base material and a platinum alloy of platinum and a transition metal element supported on the conductive base material has been found to exhibit superior low hydrogen voltage performance and durability. In particular, in the electrode for hydrogen generation, the transition metal element (hereunder referred to as "additional metal") may be one metal selected from the group consisting of nickel, cobalt, copper, silver, and iron, and the platinum content in the platinum alloy may be in a range of 0.40 to 0.99 by mole ratio.

Furthermore, it has been found that the above-mentioned electrode for hydrogen generation is obtained by a method including: coating a metal compound solution of the additional metal and a platinum compound solution which forms an ammine complex on the conductive base material; drying at a temperature of 200° C. or less; thermally decomposing at a temperature in a range from more than 200° C. to 700° C. or less; and then subjecting to a reduction processing.

Thereafter, further investigation has been performed, and it has been found that the above-mentioned electrode for hydrogen generation has the following superior performances. In the case in which it is used as a cathode within water or alkali metal chloride aqueous solution, it has a very low hydrogen overvoltage, and even when iron ions are present in the electrolyte, the rise in the overvoltage is very small, and in addition, the catalyst does not fall off during electrolysis, of course, and also during non-regular operations such as stopping and restarting the electrolysis, and the present invention has finally been accomplished.

Effects of the Invention

In accordance with the present invention, an electrode for hydrogen generation can be easily obtained which has a low hydrogen overvoltage performance and excellent durability.

With regard to the electrode for hydrogen generation of the present invention, the hydrogen overvoltage does not rise as a result of poisoning due to iron ions in the electrolyte, which was a shortcoming of conventional platinum-type catalysts. Furthermore, peeling and exfoliation of the catalyst during electrolysis operations and stop-and-start control does not occur. Consequently, the low hydrogen overvoltage characteristics that are intrinsically possessed by platinum can be stably maintained over the long-term, and in particular, it is possible to considerably reduce the energy requirements in industries of the electrolysis of water or alkali metal aqueous solution and the like in which several stops and restarts are conducted in one year and iron contamination in the catholyte are unavoidable.

BRIEF DESCRIPTION OF THE SYMBOLS

Figure 1:
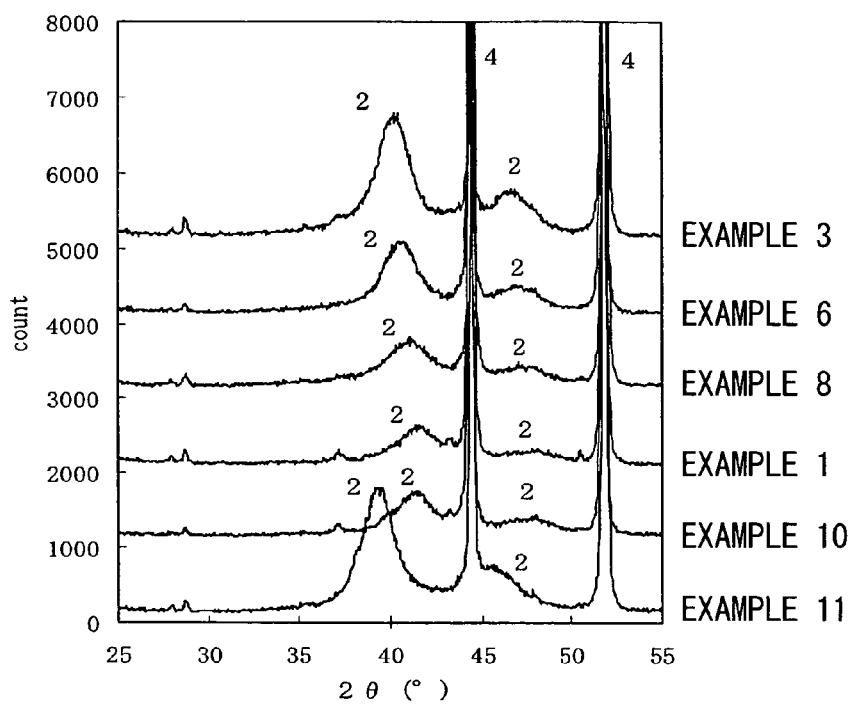
FIG. 1 represents X-ray diffraction diagrams of the electrodes for hydrogen generation after a reduction process which are obtained in Examples 1, 3, 6, 8, 10, and 11, wherein the X axis (horizontal axis) is the angle of diffraction ($2\theta$, unit is ° (degrees)), and the Y axis (vertical axis) is the count (unit is arbitrary).

1 Platinum peaks
2 Peaks of the platinum alloy including an additional metal and platinum
3 Nickel oxide peaks
4 Nickel (conductive base material) peaks
5 Peaks of the amorphous coating including an additional metal and platinum

BEST MODE FOR CARRYING OUT THE INVENTION

The present invention is explained in detail as follows.

In the electrode for hydrogen generation of the present invention, a platinum alloy including an additional metal and platinum is supported on a conductive base material, and the electrode for hydrogen generation is obtained by, for example, the following processes. A solution of the additional metal compound and a platinum compound solution which forms ammine complex are coated on the conductive base material, and are dried at a temperature of 200° C. or less, and then subjected to a thermal decomposition at a temperature exceeding 200° C. and not more than 700° C. and a reduction process. The supported material thereof is not present as neither of a mixture of the additional metal and the platinum metal and a mixed oxide or a complex oxide of an additional metal oxide and platinum, but it is a platinum alloy in which the additional metal and platinum are in a solid solution. The supported material becomes a superior catalyst as an electrode for hydrogen generation.

Furthermore, with regard to the reduction process, it is preferable to be an electrochemical reduction, and more preferable to be an electrochemical reduction at the time of electrolysis of water or alkali metal chloride aqueous solution. In the present invention, the platinum alloy including the additional metal and platinum naturally includes a platinum alloy of the additional metal and platinum which contains unavoidable impurities contaminated from the raw materials and the like.

Furthermore, with regard to the platinum alloy in the present invention, it is essential for the platinum content within the platinum alloy to be in a range of 0.40 to 0.99 by mole ratio.

In the case in which the platinum content within the platinum alloy is less than 0.4 by mole ratio, the hydrogen overvoltage becomes high and the durability becomes inferior; thereby, the effects of the present invention cannot be obtained. Conversely, in the case in which the platinum content within the platinum alloy exceeds 0.99 by mole ratio, although the initial hydrogen voltage is comparable, the durability becomes inferior in that the overvoltage rises due to iron ions in the electrolyte, and the like; thereby, the effects of the present invention cannot be obtained.

Preferably, the platinum content within the platinum alloy is in a range of 0.45 to 0.96 by mole ratio, and more preferably is in a range of 0.49 to 0.96.

Here, in the present invention, the platinum content within the platinum alloy means a value obtained by dividing the number of moles of platinum within the platinum alloy by the total number of moles of all the elements (excluding the unavoidable impurities) that constitute the platinum alloy. That is to say, for example, with regard to a platinum alloy consisting the two components of an additional metal and platinum except unavoidable impurities, the platinum content means the value calculated by the formula of (Number of moles of platinum)/(Number of moles of platinum+Number of moles of the additional metal).

Furthermore, for example, with regard to a platinum alloy consisting a ternary compound system of platinum, component X, and component Y except unavoidable impurities, the platinum content represents the value calculated by the formula of (Number of moles of platinum)/(Number of moles of platinum+Number of moles of the component X+Number of moles of the component Y).

In relation to the platinum alloy, platinum forms alloy phases such as solid solutions or intermetallic compounds with many metal atoms, and the alloy phases change in a variety of ways depending on the composition ratio thereof and the temperature. These have been disclosed in alloy phase diagrams such as a fully solid solution type, a precipitation type, a peritectic reaction type, a eutectic reaction type, and a monotectic reaction type.

For example, in the case of an alloy in which platinum and cobalt is combined, the alloy phase diagram thereof belongs in the precipitation type, and platinum and cobalt forms an alloy in which they are in a solid solution state in any composition ratio. Furthermore, in addition to platinum and cobalt, many elements such as nickel, copper, silver, iron, molybdenum, and manganese and platinum form an alloy in which they are in a solid solution state in any composition ratio (written and edited by Seizo Nagasaki and Makoto Hirabayashi "Binary Alloy Phase Diagram Collection", Agune Gijyutsu Center Publishing, Second Edition, pages 13, 112, 136, 152, 230, 212, and 205).

In the present invention, the "platinum alloy including platinum and one metal selected from the group consisting of nickel, cobalt, copper, silver, and iron" refers to one in which platinum and one metal selected from the group consisting of nickel, cobalt, copper, silver, and iron are in a solid solution state and are alloyed. For example, it is identifiable from the (111) plane spacing of metallic platinum in the X-ray main diffraction peaks obtained using CuKα rays.

Specifically, as is disclosed in the ASTM card, No. 4-0802, the crystal structure of metallic platinum is a face-centered cubic lattice, and the (111) plane spacing which is one of the main diffraction peaks obtained using CuKα rays is 2.265 angstroms. As a result of this metallic platinum and a metal having a different atomic radius becoming a solid solution and alloyed, the lattice of the metallic platinum expands or contracts, and the plane spacing changes. Accordingly, the occurrence of alloying can be confirmed by presence or absence of a shift in the diffraction peaks in the X-ray main diffraction measurement using CuKα rays, that is to say, the presence or absence of a change in the (111) plane spacing of metallic platinum.

Here, the atomic radius is half of the minimum interatomic distance, and the ranking of the atomic radii of metallic platinum and the additional metal can be estimated from, for example, Table 11.169 (general values of interatomic distances) on page 1401 to page 1403 of the Chemistry Handbook Fundamental Volume Revised Second Edition (author Association of the Chemical Society of Japan, published by Maruzen Ltd., May 20, 1977 second printing).

That is to say, compared to the interatomic distance of Pt—Pt (metallic) of 2.775 angstroms, the interatomic distance of Ni—Ni (metallic) is 2.492 angstroms, the interatomic distance of Co—Co (metallic) is 2.506 angstroms, the interatomic distance of Cu—Cu (metallic) is 2.556 angstroms, the interatomic distance of Fe—Fe (metallic) is 2.482 angstroms, and they are small compared to the interatomic distance of metallic platinum. Consequently, when platinum and the one metal selected from the group consisting of nickel, cobalt, copper, and iron becomes a solid solution and alloyed, the lattice of metallic platinum contracts, and the plane spacing is narrowed.

On the other hand, the interatomic distance of Ag—Ag (metallic) is 2.889 angstroms and is large compared to the interatomic distance of metallic platinum. Therefore, when silver and platinum become a solid solution and alloyed, the lattice of metallic platinum expands, and the plane spacing widens.

Accordingly, as described above, the occurrence of alloying can be confirmed by the presence or absence of a shift in the diffraction peaks in the X-ray main diffraction measurement using CuKα rays, that is to say, it can be confirmed by a change in the plane spacing of the (111) plane of metallic platinum, although the change value depends on the type of the additional element and the platinum content. With regard to the platinum alloy in the present invention, the (111) plane spacing is 2.120 to 2.264 angstroms in the case of containing nickel, 2.130 to 2.264 angstroms in the case of containing cobalt, 2.150 to 2.264 angstroms in the case of containing copper, 2.270 to 2.320 angstroms in the case of containing silver, and 2.170 to 2.264 angstroms in the case of containing iron.

However, even when the (111) plane spacing is in the above-mentioned range, if the platinum content within the platinum alloy departs from the range of 0.4 to 0.99 by mole ratio, the effects of the present invention may not be exhibited.

Examples of the conductive base material used in the present invention include, for example, nickel, iron, copper, titanium, and stainless alloy steel, and in particular, nickel is preferable, because it has a superior corrosion resistance to alkaline solutions. There are no particular restrictions on the shape of the conductive base material, and in general, a shape that is matched with the electrodes in the electrolytic cell is acceptable. For example, it is possible to utilize a flat plate, a curved plate, and the like.

Furthermore, with regard to the conductive base material used in the present invention, a porous plate is preferable, and for example, expanded metal, punched metal, a net, and the like can be utilized.

For the method for manufacturing the electrode for hydrogen generation of the present invention, any kind of production method may be applied as long as a platinum alloy including an additional metal and platinum can be supported on the conductive base material. For example, it is possible to use the electroplating method, the dispersive plating method, the spray coating method, the thermal decomposition method, the arc ion plating method, and the like.

However, in the case in which these already known production methods are used, in order to support the platinum alloy including an additional metal and platinum on the conductive base plate, it is necessary to examine the manufacturing conditions and the raw materials. By simply applying the already known production methods, the electrode for hydrogen generation provided by the present invention in which a platinum alloy including an additional metal and platinum is supported on the conductive base material cannot be manufactured.

Hereunder, a specific method for manufacturing the electrode for hydrogen generation provided by the present invention, in which a platinum alloy including an additional metal and platinum is supported on the conductive base material, is explained in detail, giving the thermal decomposition method as an example.

In the present invention, the thermal decomposition method refers to a series of operations in which an additional metal compound solution and a platinum compound solution are coated on the base material, and dried, and then subjected to a thermal decomposition. With regard to methods for supporting a catalyst on the conductive base material by the thermal decomposition method so as to manufacture an electrode for hydrogen generation, many propositions conventionally exist; however, the effects of the present invention cannot be obtained by simply applying the same.

That is to say, when the thermal decomposition method is performed, in the case in which any one amongst the platinum compound solution, the drying temperature, and the thermal decomposition temperature departs from the conditions provided by the present invention, the electrode for hydrogen generation provided by the present invention, which supports a platinum alloy including an additional metal and platinum, cannot be obtained, and the effects of the present invention cannot be obtained.

Firstly, the essential requirements in the present invention are described in detail below.

It is necessary for the platinum compound solution used in the present invention to be a platinum compound solution that forms an ammine complex. As platinum compounds that form ammine complexes, dinitrodiammine platinum, tetraammine platinum salt, hexaammine platinum salt are known, and one or two or more are selected from amongst these.

The solvent may be water, an organic solvent such as an alcohol, or a mixture thereof.

However, in the case in which a solution of a platinum compound that does not form an ammine complex, for example, platinum chloride and chloroplatinic acid is used, the effects of the present invention cannot be obtained.

In a production of the electrode for hydrogen generation by a conventional thermal decomposition method, a platinum compound solution that does not form an ammine complex, such as chloroplatinic acid, has been generally utilized. However, in the case in which an additional metal compound solution and a platinum compound solution that does not form an ammine complex are used, even when, for instance, the other conditions are the same as those in the present invention, and a reduction process is performed after a thermal decomposition, a platinum alloy cannot be obtained.

The reason for this can be estimated as follows. In a supported material obtained by coating an additional metal compound solution and a solution of platinum compound such as chloroplatinic acid and performing thermal decomposition, the additional metal and platinum distribute unevenly, and platinum rich portions and additional metal rich portions are separately distributed. Therefore, even when, for instance, a reduction process is performed, an electrode for hydrogen of a mixture, a mixture of oxides, or complex oxides of platinum and the additional metal can only be obtained.

If a solution provided in the present invention that forms a platinum ammine complex is used as the platinum compound solution, not only platinum, but the additional metal also forms an ammine complex, and the additional metal and platinum are evenly distributed, and are supported on the base material. Consequently, it can be estimated that a hydrogen generation electrode including an alloy of an additional compound and platinum can be obtained by the subsequent reduction process.

Furthermore, even when a platinum compound that forms an ammine complex is used, in the case in which the additional metal is not one provided in the present invention, that is to say, the additional metal is not one metal selected from the group consisting of nickel, cobalt, copper, silver, and iron, the effects of the present invention cannot be obtained even if the other conditions are the same as those in the present invention. For example, a platinum alloy cannot be obtained, or even if a platinum alloy is obtained, the characteristics as an electrode for hydrogen generation become inferior. For example, in the case in which the electrode for hydrogen generation is manufactured using cerium as the additional metal, and the other conditions are the same as those in the present invention, the supported material becomes a mixture of platinum and cerium oxide, and the effects of the present invention cannot be obtained.

In the present invention, it is essential to perform drying at a temperature of 200° C. or less.

If the drying temperature exceeds 200° C., the solvent rapidly evaporates or boils from the additional metal compound solution and/or the platinum compound solution that forms the ammine complex, and it becomes a state where a part of the additional metal and/or platinum or the entirety thereof keeps away from the base material. Hence exfoliation during the subsequent reduction process, or exfoliation during utilizing as an electrode for hydrogen generation occurs. Therefore the effects of the present invention cannot be obtained.

In the present invention, thermal decomposition is performed at a temperature in a range from more than 200° C. to 700° C. or less, using an electric furnace in an air atmosphere or the like.

If the thermal decomposition temperature is 200° C. or less, the adhesion between the base material and a part of the additional metal and/or platinum, or the entirety thereof decreases, and exfoliation during the subsequent thermal decomposition operation, or exfoliation during utilizing as an electrode for hydrogen generation occurs. Hence the effects of the present invention cannot be obtained. On the other hand, if the thermal decomposition temperature is more than 700° C., the hydrogen overvoltage performance becomes considerably inferior for reasons that sintering of the platinum occurs or an alloy of the additional metal and platinum is not able to be obtained. Therefore, the effects of the present invention cannot be obtained.

Figure 2:
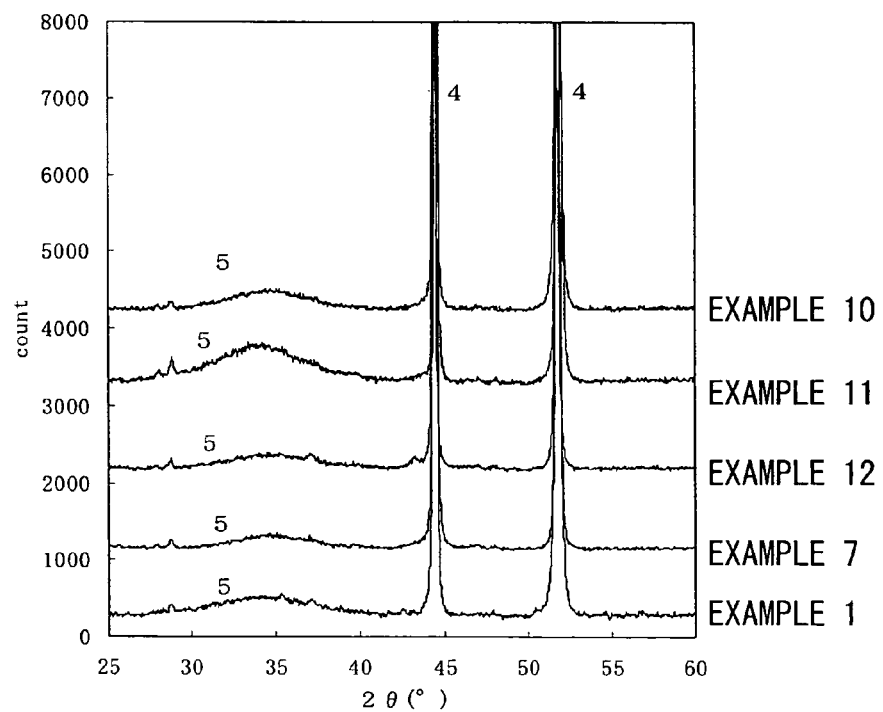
FIG. 2 represents X-ray diffraction diagrams of the electrodes for hydrogen generation before the reduction process which are obtained in Examples 1, 7, 10, 11, and 12, wherein the X axis (horizontal axis) is the angle of diffraction ($2\theta$, unit is ° (degrees)), and the Y axis (vertical axis) is the count (unit is arbitrary).

The state of the additional metal and platinum supported on the base material after the thermal decomposition operation is still unclear. However the X-ray diffraction pattern of the coating after the thermal decomposition obtained using CuKα rays is different from any one of the diffraction pattern of the additional metal such as a transition metal element, the diffraction pattern of platinum metal, and the diffraction pattern of an alloy of the additional metal and platinum, and it exhibits a diffraction pattern indicating an amorphous state (FIG. 2). Therefore it is speculated that the additional metal and platinum within the coating do not exist in a metallic state after the thermal decomposition, but exist in a high valence state.

Consequently, in the present invention, after the thermal decomposition operation, in order to reduce the additional metal and platinum to a metallic state and alloy the additional metal and platinum, it is essential to perform the reduction process.

Next, the following is not essential to the present invention; however, the favorable requirements for further increasing the effects of the present invention are described below in detail.

With regard to the conductive base material, it is preferable that the base material surface be roughened beforehand. This is because the contact surface area can be made large as a result of roughening; thereby, the adhesion between the base material and the supported material can be improved.

With regard to the means of roughening, there are no particular restrictions, and commonly known methods can be applied, for example, a method can be applied in which the conductive base material is subjected to a sandblasting process, an etching process using a solution of oxalic acid, hydrochloric acid solution and the like, water washing and drying.

As the platinum compound which forms an ammine complex and is used in the method for manufacturing the electrode for hydrogen generation of the present invention, it is preferable to use a compound selected from amongst those in which the ammine complex can also form a complex with the additional metal.

Amongst the platinum compounds that form an ammine complex, dinitrodiammine platinum is preferable because if dinitrodiammine platinum is used, the crystallite diameter of the platinum alloy after the reduction process can be made fine, for example, to be 200 angstroms or less; thereby, the reactive specific surface area can be made increased. This may be because dinitrodiammine platinum has a high thermal decomposition temperature of approximately 550° C., which restricts the cohesion of platinum during the thermal decomposition, and a coating in which the additional metal and platinum are evenly mixed can be obtained after the thermal decomposition, and a fine crystallite type alloy can be obtained by the reduction process.

On the other hand, there are no particular restrictions in regard to the additional metal compound used in the manufacturing method of the present invention, and a nitrate, a sulfate, a chloride, a carbonate, an acetate, a sulfamic acid salt, and the like can be used.

Furthermore, as a solvent for dissolving the platinum compound and the additional metal compound, one which can completely dissolve these raw materials is preferable in order to increase the surface area of the supported material, and water, or a solution of inorganic acids such as nitric acid, hydrochloric acid, sulfuric acid and an acetic acid, organic solvents such as methanol, ethanol, propanol and butanol, or a mixture thereof can be used.

Furthermore, the pH of the coating liquid may be adjusted for the purpose of restricting the dissolution of the base material metal into the coating liquid. And it is also acceptable to complex the additional metal by adding complex salts of lysine, citric acid, and the like in order to increase the surface area of the supported material.

With regard to the method for coating the compound solution on the conductive base material, the additional metal compound solution and the platinum compound solution that forms an ammine complex can be separately coated on the conductive base material using a brush and the like, or a mixed solution of the additional metal compound and the platinum compound can be prepared and coated on the conductive base material using a brush and the like.

Furthermore, in addition to the aforementioned brush coating, it is possible to suitably use all already known methods such as the spraying method and the dip coating method.

It is acceptable if the drying after the coating is conducted at a temperature of 200° C. or less for 5 to 60 minutes, and it is preferable for the drying temperature to be 150° C. or less.

In the case in which the drying temperature is too high, the effects of the present invention cannot be obtained as mentioned above; however, the lower limit of the drying temperature may be set to a temperature at which the solution can be dried, and may be appropriately set in accordance with the used solvent.

It is acceptable if the thermal decomposition after the drying is conducted at a temperature in the range from more than 200° C. to 700° C. or less for 5 to 60 minutes; however, the thermal decomposition is preferably conducted at a temperature of not more than the thermal decomposition temperature of the platinum ammine complex, because the sintering of platinum is restricted, and an electrode for hydrogen generation having an even lower hydrogen overvoltage can be obtained.

For example, the thermal decomposition temperature of dinitrodiamine platinum is 550° C., and in the case in which a dinitrodiamine platinum solution is used, the thermal decomposition temperature range is preferably to be a range from more than 200° C. to 550° C. or less, and more preferably to be a range from 350° C. or more to 500° C. or less.

If the thermal decomposition temperature is too low, as mentioned above, there is a tendency for peeling of the supported material during the subsequent reduction process and/or during hydrogen generation. On the other hand, as mentioned above, if it is too high, the effects of the present invention are not obtained as a result of sintering of the platinum and the like.

In the case in which other platinum compounds that form an ammine complex are used, in the same manner as the dinitrodiamine platinum solution, an appropriate thermal decomposition temperature may be set within a range from more than 200° C. to 700° C. or less.

In the case in which the dinitrodiamine platinum solution is used, a thermal decomposition in air at a temperature of more than 700° C. is one of the sufficient conditions for oxidizing the additional metal compound and the platinum compound. However, the hydrogen generation electrode obtained by this method is inferior in the overvoltage performance and the like. Therefore, the effects of the present invention cannot be obtained.

The series of operations of coating, drying, and thermal decomposition mentioned above is performed once, or is repeated several times. There are no particular restrictions on the number of times the thermal decomposition operation is repeated; however, in order to obtain a low hydrogen overvoltage, it is preferable to repeat the thermal decomposition operation until the supported quantity of the alloy after the reduction process becomes 0.5 g/m$^2$ or more, and it is more preferable to repeat the thermal decomposition operation until it becomes 1 g/m$^2$ or more.

After thermal decomposition, a reduction process is conducted for the purpose of reducing the supported material to a metallic state and alloying it. There are no particular restrictions on the reduction process method; and it is possible to use the chemical reduction method resulting from a contact with a material having a strong reducing power such as hydrazine, formic acid, oxalic acid and the like, or the electrochemical reduction method which applies a reducing potential to the platinum and the additional metal.

For example, the electrochemical reduction method is a method that applies a necessary potential for reduction to the additional metal and platinum. The standard electrode potentials of platinum and the additional metal in an aqueous solution have already been disclosed ("Electrochemical Handbook", Fifth Edition, Maruzen Publishing, pages 92 to 95), and it is possible to estimate the necessary potential for reduction from the standard electrode potentials.

The electrochemical reduction method is one of the preferable embodiments of the present invention for reducing the supported material after thermal decomposition to a metallic state and alloying it, and this means that the electrode after the thermal decomposition and before the reduction process is also a preferable configuration of the electrode for hydrogen generation of the present invention.

The electrode for hydrogen production of the present invention may be an electrode for hydrogen generation which includes a conductive base material and an amorphous material of a transition metal element and platinum supported on the conductive base material, wherein a platinum alloy of platinum and a transition metal element is supported using the reduction process. Furthermore, from the above-mentioned explanation of X-ray diffraction patterns, the electrode for hydrogen production of the present invention may be an electrode for hydrogen generation in which the X-ray diffraction pattern of the amorphous material is different from any one of the platinum alloy of platinum and the transition metal element, the transition metal element, and platinum.

At this point, it is preferable for the reduction process to be an electrochemical reduction. Furthermore, it is preferable for it to be an electrochemical reduction at the time of the electrolysis of water or alkali metal chloride aqueous solution.

Moreover, it is preferable for the transition metal to be one metal element selected from the group consisting of nickel, cobalt, copper, silver, and iron.

The method for manufacturing this electrode may be a method which includes: coating a metal compound solution of one selected from the group consisting of nickel, cobalt, copper, silver, and iron, and a platinum compound solution which forms an ammine complex, on the conductive base material, drying at a temperature of 200° C. or less, and then thermally decomposing at a temperature in a range from more than 200° C. to 700° C. or less.

Furthermore, in regard to the method for electrolyzing water or alkali metal chloride aqueous solution, this electrode is, of course, suitably used as an electrode for hydrogen generation.

That is to say, even when the electrode in which thermal decomposition is performed and the reduction process is not performed, is used as an electrode for hydrogen generation, in the initial stages of usage, the supported material is subjected to an electrochemical reduction, and is reduced to the metallic state and is alloyed. Therefore, the effects of the present invention are sufficiently exhibited.

Accordingly, the electrode may be provided by subjecting to a thermal decomposition and a reduction process so as to make supported material a platinum alloy, and then the electrode may be mounted in the electrolytic cell to use as an electrode for hydrogen generation. Also, the electrode may be provided by subjecting to a thermal decomposition and not being subjected to a reduction process, and then the electrode may be mounted in the electrolytic cell to use as an electrode for hydrogen generation. In either case, in the initial stages of usage as an electrode for hydrogen generation, the only difference is whether it is already a platinum alloy, or it becomes a platinum alloy, and the performance thereafter is the same.

In the case where the electrode in which the supported material after being subjected to a thermal decomposition is not subjected to a reduction process is mounted in the electrolytic cell, and is used as an electrode for hydrogen generation, there are no limitations on the electrolysis conditions at the time of usage, and the conventional electrolysis starting conditions are applicable.

For example, in the case in which the electrode is used as the electrode for hydrogen generation in a sodium chloride electrolysis by the ion exchange membrane method, it is acceptable if the electrolyte temperature is 70 to 90° C. at the time of usage, the electrolyte concentration (sodium hydroxide) in the cathode chamber is 20 to 40 wt %, and the current density is 0.1 to 10 kA/m².

With regard to the supported material which is not subjected to the reduction process, in the aforementioned conditions, the platinum alloy can be obtained within roughly 10 minutes.

For example, with regard to its utilization as the electrode for hydrogen generation in a sodium chloride electrolysis by the ion exchange membrane method, in the case in which it is used at an electrolyte temperature of 70 to 80° C., an electrolyte concentration in the cathode chamber is 30 to 33 wt %, and the current density is 0.3 kA/m², for 1 or 2 minutes from the start of the electrification, the electrical current is mainly utilized for the electrochemical reduction of the supported material, and the hydrogen generation reaction hardly occurs.

However, after the supported material has been reduced, and it has become a platinum alloy, the electrical current is utilized for the hydrogen generation reaction, and thereafter, it becomes an excellent electrode for hydrogen generation that maintains a low hydrogen overvoltage over a very long period.

In the case in which the electrode is mounted in the electrolytic cell and the reduction reaction has been performed beforehand, if it is used in the aforementioned conditions, the hydrogen generation reaction occurs at a low hydrogen overvoltage directly after electrification, and thereafter, it is the same as described above.

Whether or not the reduction process is performed before mounting in the electrolytic cell may be appropriately decided upon consideration of the cost of reduction processing before mounting in the electrolytic cell, and the cost of production loss due to there being no hydrogen generation in the initial stage of electrolysis activation.

Furthermore, the chemical reduction method is a method in which the reduction is performed using a material with a strong reducing power such as hydrazine, formic acid, and oxalic acid. In particular, it is acceptable if the electrode is immersed in a hydrazine aqueous solution which is prepared to a concentration of a few wt % for the period until the additional metal and platinum are reduced.

If an electrode for hydrogen generation of the present invention obtained in this manner is used as an electrode for hydrogen generation in an electrolysis application of water or alkali metal chloride aqueous solutions such as sodium chloride, as well as a low hydrogen overvoltage being able to be obtained, the low overvoltage characteristic can be stably maintained for long periods without a special means for not allowing iron ions to be mixed into the catholyte. Moreover, peeling or exfoliation of the catalyst does not occur at the time of the stopping and restarting operations. That is to say, it is an electrode for hydrogen generation that is very superior in the hydrogen overvoltage performance and durability.

Accordingly, in the electrolysis industry fields of water or alkali metal chloride aqueous solutions such as sodium chloride, by only changing the electrode for hydrogen generation to the electrode for hydrogen generation provided by the present invention, it becomes possible to easily reduce the energy requirements of these electrolysis industries.

EXAMPLES

Hereunder, the examples of the present invention are described; however, the present invention is not restricted by these examples.

The evaluations were performed by the methods described below.

(Crystal Structure)

With regard to an electrode surface after the execution of thermal decomposition in which the reduction process has not been performed, crystal structures were measured under conditions in which a X-ray diffractometer using CuKα ray (model MxP3 manufactured by Mac Science Co.) was used, an acceleration voltage was 40 kV, an acceleration current was 30 mA, a step interval was 0.04 deg, a sampling time was 3 sec, and a measurement range was in the range of $2\theta=20°$ to $60°$.

Furthermore, with regard to an electrode surface in which the reduction process has been performed, crystal structures were measured under conditions in which a X-ray diffractometer using CuKα ray (model MXP3 manufactured by Mac Science Co.) was used, an acceleration voltage was 40 kV, an acceleration current was 30 mA, a step interval was 0.04 deg, a sampling time was 3 sec, and a measurement range was in the range of $2\theta=20°$ to $60°$. From the diffraction patterns, the (111) plane spacing which represents the main diffraction peak was calculated in accordance with the Bragg's Law.

(Supported Quantity and Platinum Content)

With regard to an electrode in which cobalt, copper, or iron has been added, the supported portion was dissolved in a aqua regia, and then the contents of platinum and the additional metal elements were determined using an ICP emission spectrometer (manufactured by Perkin-Elmer Co., model optima 3000). With regard to an electrode in which nickel or silver has been added, the reduction process was conducted, and then the contents of platinum and the additional metal elements were determined using an EPMA (manufactured by Horiba, Ltd., model EMAX-5770W). The supported quantity was calculated, and the platinum content within the supported material was calculated in accordance with the formula below.

Platinum content=Platinum/(Platinum+Additional metal) in mole ratio (Water Electrolysis Testing)

Using an electrolyte (volume approximately 0.5 L) of a 32 wt % sodium hydroxide aqueous solution, water electrolysis was performed for 1 week under the conditions of Ni as the counter electrode, room temperature, and a current density of 5 kA/m$^2$. The hydrogen overvoltages after the water electrolysis were measured by the following method.

(Sodium Chloride Electrolysis Testing)

An electrode in which the reduction process had been performed was cut out into 4 cm×7.5 cm, and a sodium chloride electrolysis test by the ion exchange membrane method was performed in a small testing vessel.

A DSE (registered trademark) manufactured by Permelec Electrode Co. of the same size as the aforementioned cathode was used as the anode, and a N-962 manufactured by DuPont Co. was utilized as the fluorine type cationic exchange membrane, and the effective electrolytic area of the aforementioned membrane was made to be the same as the aforementioned cathode.

The anode and the fluorine type cationic exchange membrane were adhered, and the distance between the fluorine type cationic exchange membrane and the cathode was made to be 2 mm.

To the anode chamber, 310 g/liter of purified brine was supplied, and the flow rate was adjusted such that it was discharged at 200 g/liter.

To the cathode chamber, deionized water, or an aqueous solution in which an iron standard solution (manufactured by Kanto Kagaku Ltd., Fe: 1000 mg/L) was diluted by 20 times with deionized water (hereunder referred to as "iron-containing water") was supplied, and the water charge rate or the iron-containing water charge rate was adjusted such that the sodium hydroxide aqueous solution concentration at the outlet became 32 wt %.

The anode chamber and the cathode chamber were adjusted to 90° C. by an internal heater, and the sodium chloride electrolysis test was performed at a electrolysis current density of 5 kA/m$^2$.

Resin materials made of acrylic or Teflon (registered trademark), or non-iron materials such as titanium or nickel were used for all of the liquid contacting portions such as the small testing vessel, an electrolyte supply pipe, and a pump; thereby, the iron mixed in the catholyte was made to be only the iron of the iron-containing water.

The hydrogen overvoltage during sodium chloride electrolysis was measured by the method described below.

The iron ion concentration within the catholyte (sodium hydroxide aqueous solution) was measured by an ICP.

(Hydrogen Overvoltage)

The hydrogen overvoltage during water electrolysis testing was measured by the current interrupter method using a 32 wt % sodium hydroxide electrolyte (volume approximately 1 L), and performing electrolysis under conditions in which Ni was used as the counter electrode, a temperature was 90° C., and a current density was 5 kA/m$^2$.

With regard to the hydrogen overvoltage after sodium chloride electrolysis, the cathode overvoltage at the time of the aforementioned sodium chloride electrolysis testing was measured by the current interrupter method.

Example 1

A nickel expanded mesh (10×10 cm) was used as the conductive base material, and as a roughening process, etching was performed using a 10 wt % hydrochloric acid solution at a temperature of 50° C. for 15 minutes, and then water washing and drying were performed.

Next, the coating solution (mixed solution) in which a platinum content was 0.5 by mole ratio and a total concentration of platinum and nickel was 5 wt % by metal conversion was prepared using a dinitrodiammine platinum nitrate solution (manufactured by Tanaka Noble Metals Ltd., platinum concentration: 4.5 wt %, solvent: 8 wt % nitric acid solution), nickel nitrate hexahydrate, and water.

Next, this coating solution was coated on all over the surface of the nickel expanded mesh using a brush, and was dried at 80° C. for 15 minutes in a hot air type dryer, and then thermal decomposition was performed under a circulation of air at 500° C. for 15 minutes using a box-shaped muffle furnace (manufactured by Advantec Toyo, model KM-600, internal capacity: 27 L). This series of operations was repeated five times.

Next, the reduction process was performed in a 32 wt % sodium hydroxide aqueous solution of which the temperature is 88° C. at a potential of −11.0 V (vs. 1 N-NaOH, Hg/HgO) for five minutes; thereby, an electrode for hydrogen generation was prepared in which the platinum and the nickel were alloyed, and was evaluated by the above-mentioned methods. The results thereof are shown in Tables 1 to 2, the X-ray diffraction diagram after the reduction process is shown in FIG. 1, and the X-ray diffraction diagram after the thermal decomposition and before the reduction process is shown in FIG. 2.

From FIG. 2, nickel peaks (4) of the base material and a broad peak (5) of the amorphous material including nickel which is the additional metal and platinum were recognized in the X-ray diffraction diagram before the reduction process. Furthermore, from FIG. 1, nickel peaks (4) of the base material and peaks (2) of the platinum alloy of nickel which is the additional metal and platinum were recognized in the X-ray diffraction diagram after the reduction process.

It can be understood that the peak patterns and the peak positions (angle of diffraction) of the broad peak (5) of the amorphous material are clearly different from those of the peaks (2) of the platinum alloy.

The sodium chloride electrolysis test was performed for one month while supplying deionized water to the cathode chamber. The cathode overvoltage during this time remained within a range of 70 to 75 mV with stability. Furthermore, the iron ion concentration within the caustic soda solution during this time was below the limit of detection (1 ppm).

After the completion of the electrolysis test, the cathode was removed and subjected to evaluation, neither peeling of the supported material of the electrode for hydrogen generation, nor abnormalities such as discoloration of the utilized anode and the ion exchange membrane were observed.

The sodium chloride electrolysis test was performed for ten days while supplying iron-containing water to the cathode chamber. The cathode overvoltage during this time remained within a range of 75 to 80 mV with stability. The iron concentration within the caustic soda solution during this time was 6 ppm.

From these results, it can be understood that the cathode for hydrogen generation provided by the present invention can be preferably utilized in the IM sodium chloride electrolysis industry and the like in which iron ions are mixed into the catholyte, without performing any special means for preventing iron ion contamination.

Examples 2 to 8

Except using cobalt nitrate hexahydrate as the additional metal compound and changing the platinum and cobalt contents in the coating solution, the electrodes for hydrogen generation were prepared and evaluated by the same operations as Example 1.

The results evaluated by the above-mentioned methods are shown in Tables 1 and 2, and the X-ray diffraction diagrams of Examples 3, 6, and 8 after the reduction process are shown in FIG. 1. Furthermore, the X-ray diffraction diagram of Example 7 after the thermal decomposition process and before the reduction process is shown in FIG. 2.

From FIG. 2, with regard to Example 7, nickel peaks (4) of the base material and a broad peak (5) of the amorphous material including cobalt which is the additional metal and platinum were recognized in the X-ray diffraction diagram before the reduction process.

Examples 9 to 10

Except using copper nitrate trihydrate as the additional metal compound and changing the platinum and copper contents of the coating solution, thermal decomposition was performed by the same operations as Example 1. The reduction process was performed by immersing in 100 mL of a hydrazine aqueous solution with a concentration of 5 wt % at room temperature overnight and then the electrode was washed by water and dried; thereby, the electrodes for hydrogen generation were prepared.

The electrodes were evaluated by the above-mentioned methods. The results thereof are shown in Tables 1 and 2, and the X-ray diffraction diagram of Example 10 after the reduction process is shown in FIG. 1. Furthermore, with regard to Example 10, the X-ray diffraction diagram after the thermal decomposition process and before the reduction process is shown in FIG. 2.

From FIG. 2, with regard to Example 10, nickel peaks (4) of the base material and a broad peak (5) of the amorphous material including copper which is the additional metal and platinum were recognized in the X-ray diffraction diagram before the reduction process. Furthermore, from FIG. 1, nickel peaks (4) of the base material and peaks (2) of the platinum alloy of copper which is the additional metal and platinum were recognized in the X-ray diffraction diagram after the reduction process.

It can be understood that the peak patterns and the peak positions (angle of diffraction) of the broad peak (5) of the amorphous material are clearly different from those of the peaks (2) of the platinum alloy.

Examples 11 to 12

Except using silver nitrate and iron nitrate hexahydrate as additional metal compounds and performing the thermal decomposition at a temperature of 300° C., the electrodes for hydrogen generation were prepared by the same operations as Example 1.

The results evaluated by the above-mentioned methods are shown in Tables 1 and 2, and the X-ray diffraction diagram of Example 11 after the reduction process is shown in FIG. 1. Furthermore, with regard to Examples 11 and 12, the X-ray diffraction diagrams after the thermal decomposition process and before the reduction process are shown in FIG. 2.

From FIG. 2, with regard to Example 11, nickel peaks (4) of the base material and a broad peak (5) of the amorphous material including silver which is the additional metal and platinum were recognized before the reduction process. Furthermore, from FIG. 1, nickel peaks (4) of the base material and peaks (2) of the platinum alloy of silver which is the additional metal and platinum were recognized in the X-ray diffraction diagram after the reduction process. It can be understood that the peak patterns and the peak positions (angle of diffraction) of the broad peak (5) of the amorphous material are clearly different from those of the peaks (2) of the platinum alloy.

In the same manner, with regard to Example 12, nickel peaks (4) of the base material and a broad peak (5) of the amorphous material including iron which is the additional metal and platinum were recognized in the X-ray diffraction diagram before the reduction process.

TABLE 1

| Example | Additional metal | Pt content Mole ratio Coating liquid | Pt content Mole ratio Supported material | Pt (111) plane spacing Å | Crystal structure |
|---|---|---|---|---|---|
| 1 | Ni | 0.50 | 0.49 | 2.191 | Alloy |
| 2 | Co | 0.95 | 0.96 | 2.260 | Alloy |
| 3 | Co | 0.80 | 0.78 | 2.235 | Alloy |
| 4 | Co | 0.75 | 0.74 | 2.231 | Alloy |
| 5 | Co | 0.70 | 0.70 | 2.227 | Alloy |
| 6 | Co | 0.60 | 0.62 | 2.220 | Alloy |
| 7 | Co | 0.50 | 0.50 | 2.202 | Alloy |
| 8 | Co | 0.40 | 0.41 | 2.195 | Alloy |
| 9 | Cu | 0.75 | 0.75 | 2.231 | Alloy |
| 10 | Cu | 0.50 | 0.52 | 2.185 | Alloy |
| 11 | Ag | 0.50 | 0.49 | 2.292 | Alloy |
| 12 | Fe | 0.50 | 0.50 | 2.200 | Alloy |

TABLE 2

| | | Hydrogen overvoltage (mV) | | | | |
|---|---|---|---|---|---|---|
| | | Before | After | After water electrolysis testing | During sodium chloride electrolysis testing | |
| Example | Additional metal | reduction process | reduction process | Iron ion concentration 0.035 ppm or less | Iron ion concentration 0.035 ppm or less | Iron ion concentration 6 ppm |
| 1 | Ni | 345 | 80 | 94 | 70 to 75 | 75 to 80 |
| 2 | Co | 335 | 78 | 90 | | |
| 3 | Co | 325 | 76 | 91 | | |
| 4 | Co | 331 | 85 | 97 | | |
| 5 | Co | 348 | 75 | 81 | | |
| 6 | Co | 352 | 77 | 86 | | |
| 7 | Co | 345 | 70 | 82 | 72 to 76 | 78 to 80 |
| 8 | Co | 338 | 77 | 93 | 83 to 87 | 102 to 107 |
| 9 | Cu | 341 | 88 | 92 | 77 to 86 | 86 to 93 |
| 10 | Cu | 329 | 86 | 94 | | |
| 11 | Ag | 315 | 67 | 90 | 80 to 88 | 93 to 98 |
| 12 | Fe | 346 | 88 | 90 | 75 to 82 | 100 to 105 |

Comparative Example 1

Except not adding the transitional metal element, the electrode for hydrogen generation was prepared by the same operations as Example 1. The results evaluated by the above-mentioned method are shown in Tables 3 and 4, and the X-ray diffraction diagram after the reduction process is shown in FIG. 3.

Figure 3:
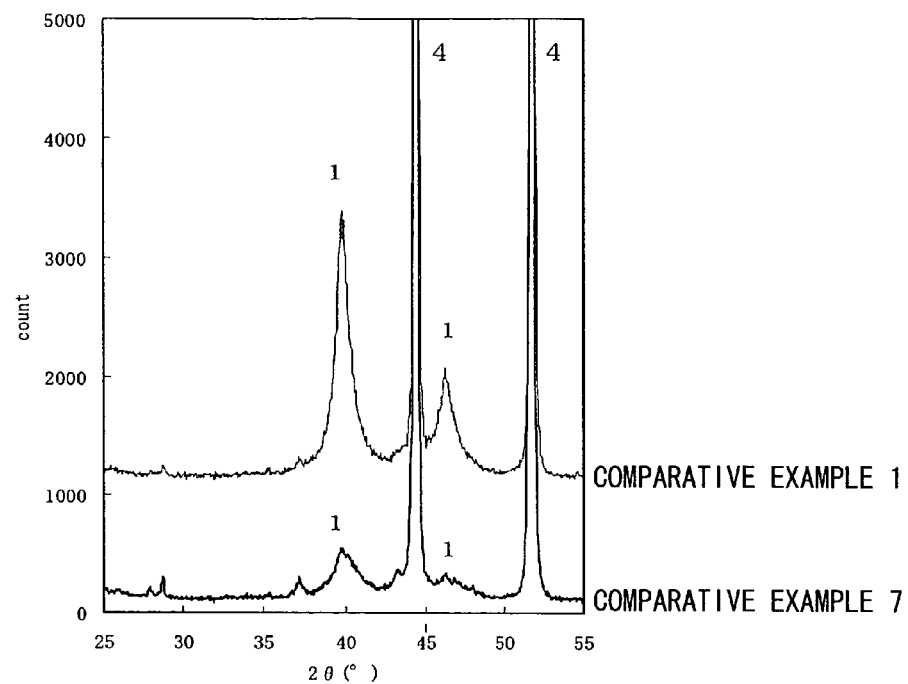
FIG. 3 represents X-ray diffraction diagrams of the electrodes for hydrogen generation which are obtained in Comparative Examples 1 and 7, wherein the X axis (horizontal axis) is the angle of diffraction ($2\theta$, unit is ° (degrees)), and the Y axis (vertical axis) is the count (unit is arbitrary).

From FIG. 3, with regard to Comparative Example 1, nickel peaks (4) of the base material and platinum peaks (1) were recognized.

Furthermore, the sodium chloride electrolysis test was performed for one month while supplying deionized water to the cathode chamber. The cathode overvoltage during this time remained in a range of 78 to 80 mV, and showed an approximately equivalent performance to the cathode for hydrogen generation provided by the present invention. The iron ion concentration within the caustic during this time was below the limit of detection (0.035 ppm).

The sodium chloride electrolysis test was performed for ten days while supplying iron-containing water to the cathode chamber. The cathode overvoltage during this time remained at a very high overvoltage of 120 to 125 mV compared to the cathode for hydrogen generation provided by the present invention. Furthermore, the iron concentration within the caustic during this time was 6 ppm.

Accordingly, in the case in which the cathode for hydrogen generation of Comparative Example 1 is used in the IM sodium chloride electrolysis industry and the like in which iron is likely to be mixed into the catholyte, it is clear that, at least as long as means for preventing iron contamination is not performed on the catholyte, a sufficiently low overvoltage cannot be obtained.

Comparative Examples 2 to 4

Except using nickel nitrate hexahydrate, cobalt nitrate hexahydrate, and silver nitrate as the additional metal compounds, and using the coating solution after changing the platinum and additional metal content, the electrode for hydrogen generations were prepared by the same operations as Example 1. The results evaluated by the above-mentioned method are shown in Tables 3 and 4.

Comparative Example 5 to 7

Except using manganese nitrate hexahydrate, molybdic acid ammonium, and vanadic acid ammonium as the additional metal compounds, and using the coating solution after changing the platinum and additional metal content, the electrode for hydrogen generations were prepared by the same operations as Example 1; however, the additional metals were completely eluted after the reduction process.

The results evaluated by the above-mentioned methods are shown in Tables 3 and 4, and the X-ray diffraction diagram with regard to Comparative Example 7 after the reduction process is shown in FIG. 3. From FIG. 3, with regard to Comparative Example 7, nickel peaks (4) of the base material and platinum peaks (1) were recognized.

Comparative Example 8

Except performing the thermal decomposition at a temperature of 750° C., the electrode for hydrogen generation was prepared by the same operations as Example 1.

Figure 4:
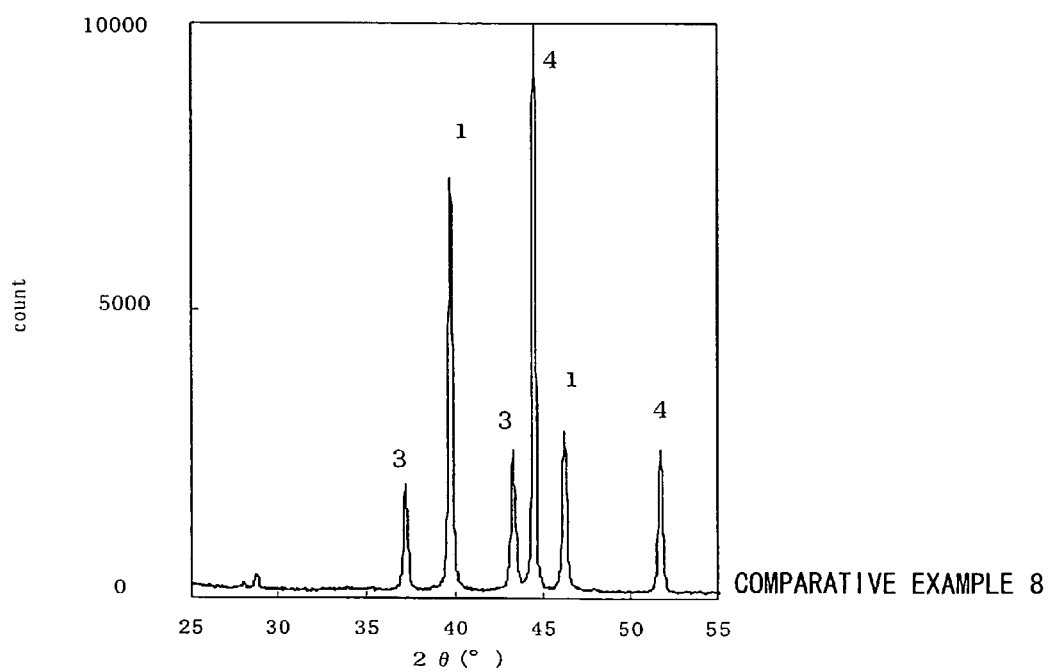
FIG. 4 represents an X-ray diffraction diagram of the electrode for hydrogen generation which is obtained in Comparative Example 8, wherein the X axis (horizontal axis) is the angle of diffraction ($2\theta$, unit is ° (degrees)), and the Y axis (vertical axis) is the count (unit is arbitrary).

The results evaluated by the above-mentioned methods are shown in Tables 3 and 4, and the X-ray diffraction diagram after the reduction process is shown in FIG. 4, which shows that it was a mixture of metallic platinum and nickel oxide. That is to say, from FIG. 4, with regard to Comparative Example 8, nickel peaks (4) of the base material, nickel oxide peaks (3), and platinum peaks (1) were recognized.

Comparative Example 9

Except using a platinum compound solution in which the Pt concentration was adjusted to 4.5 wt % by diluting a chloroplatinic acid solution (manufactured by Tanaka Noble Metals Ltd., Pt concentration: 15 wt %) with deionized water, the electrode for hydrogen generation was prepared using the same operations as Example 1.

Figure 5:
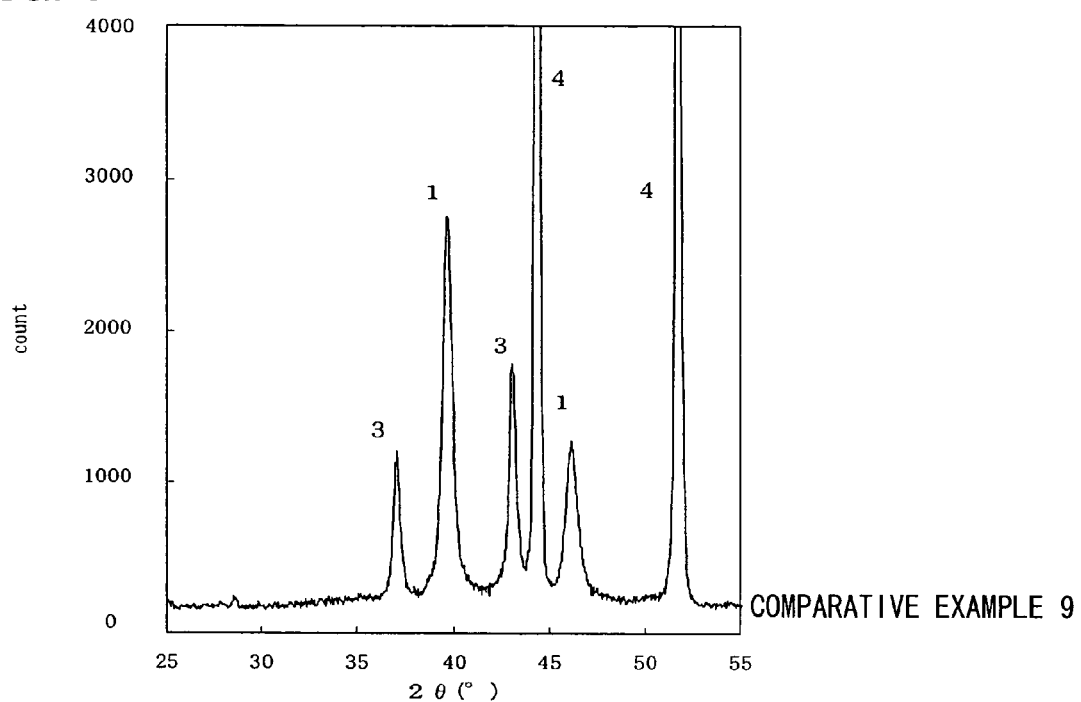
FIG. 5 represents an X-ray diffraction diagram of the electrode for hydrogen generation which is obtained in Comparative Example 9, wherein the X axis (horizontal axis) is the angle of diffraction ($2\theta$, unit is ° (degrees)), and the Y axis (vertical axis) is the count (unit is arbitrary).

The results evaluated by the above-mentioned method are shown in Tables 3 and 4, and the X-ray diffraction diagram after the reduction process is shown in FIG. 5, which shows that it was a mixture of metallic platinum and nickel oxide. That is to say, from FIG. 5, with regard to Comparative Example 9, nickel peaks (4) of the base material, nickel oxide peaks (3), and platinum peaks (1) were recognized.

TABLE 3

| Comparative example | Additional metal | Pt content Mole ratio Coating liquid | Pt content Mole ratio Supported material | Pt (111) plane spacing Å | Crystal structure |
|---|---|---|---|---|---|
| 1 | none | 1.00 | 1.00 | 2.266 | Metallic platinum |
| 2 | Ni | 0.25 | 0.26 | 2.128 | Alloy |
| 3 | Co | 0.30 | 0.31 | 2.181 | Alloy |

TABLE 3-continued

| Compara-tive example | Additional metal | Pt content Mole ratio Coating liquid | Pt content Mole ratio Supported material | Pt (111) plane spacing Å | Crystal structure |
|---|---|---|---|---|---|
| 4 | Ag | 0.25 | 0.25 | 2.340 | Alloy |
| 5 | Mn | 0.50 | 1.00 | 2.265 | Metallic platinum |
| 6 | Mo | 0.50 | 1.00 | 2.266 | Metallic platinum |
| 7 | V | 0.50 | 1.00 | 2.265 | Metallic platinum |
| 8 | Ni | 0.50 | 0.49 | 2.267 | Metallic platinum + nickel oxide |
| 9 | Ni | 0.50 | 0.49 | 2.266 | Metallic platinum + nickel oxide |

TABLE 4

| | | Hydrogen overvoltage (mV) | | | | |
|---|---|---|---|---|---|---|
| | | Before | After | After water electrolysis testing | During sodium chloride electrolysis testing | |
| Comparative example | Additional metal | reduction process | reduction process | Iron ion concentration 0.035 ppm or less | Iron ion concentration 0.035 ppm or less | Iron ion concentration 6 ppm |
| 1 | none | 360 | 100 | 110 | 78 to 80 | 120 to 125 |
| 2 | Ni | 340 | 75 | 132 | | |
| 3 | Co | 333 | 78 | 105 | 91 to 97 | 122 to 127 |
| 4 | Ag | 348 | 73 | 105 | | |
| 5 | Mn | 358 | 82 | 275 | | |
| 6 | Mo | 341 | 88 | 332 | | |
| 7 | V | 339 | 102 | 126 | | |
| 8 | Ni | 400 | 260 | 255 | | |
| 9 | Ni | 365 | 180 | 185 | 182 to 187 | |

The supported quantities after the reduction process in the Examples and the Comparative Examples in the present invention were in the range of 5 g/m² to 15 g/m². Furthermore, with regard to the X-ray diffraction diagrams of Examples 1 to 12, a metallic or oxide state of platinum and the additional metal was not detected, and it was confirmed that the (111) plane spacing which is the main diffraction peak of metallic platinum changed and that a platinum alloy in which the additional metal and the metallic platinum are in a solid solution was obtained.

Furthermore, for the purpose of testing the presence of peeling or exfoliation of the catalyst during the electrolysis operation and during the stop-and-start control, after stopping the water electrolysis test, the electrode for hydrogen generation was left in a state where it was immersed in the electrolyte for one week, and then the water electrolysis test was restarted. With regard to for the electrodes for hydrogen generation of Examples 1 to 12, the hydrogen overvoltages before and after stopping of the water electrolysis test were same, and the platinum supported quantity was unchanged.

It is clear from the results of Examples 1 to 12, that the electrode for hydrogen generation provided by the present invention possesses very superior characteristics such as the hydrogen overvoltage is low, the rise in the hydrogen overvoltage even in the presence of iron ions within the electrolyte is low, and there is neither catalyst exfoliation nor rise in hydrogen overvoltage during the electrolysis operation and during the stop-and-start control.

On the other hand, from the results of Comparative Example 1, in a cathode for hydrogen generation which does not contain nickel, cobalt, copper, silver, and iron, and essentially includes only platinum, the hydrogen overvoltage in the case in which it is utilized under conditions where iron ions are not present in the catholyte is not inferior to the cathode for hydrogen generation provided by the present invention. However, if iron ions are present within the electrolyte, the hydrogen voltage is very high, and it is clear that the effects of the present invention cannot be obtained.

From the results of Comparative Examples 2 to 4, even when it is a platinum alloy including platinum and one metal selected from the group consisting of nickel, cobalt, copper, silver, and iron, if the platinum content falls below that of the present invention, the hydrogen overvoltage rises in a very short duration, the overvoltage rise resulting from iron ions becomes very large, and the like, and it is clear that the effects of the present invention cannot be obtained.

From the results of Comparative Examples 5 to 7, in the combinations which are other than a combination of platinum and one metal chosen from the group consisting of nickel, cobalt, copper, silver, and iron, it is clear that the effects of the present invention cannot be obtained.

From the results of Comparative Examples 8 to 9, even when platinum and one metal chosen from the group consisting of nickel, cobalt, copper, silver, and iron are combined, if it is not a platinum alloy, it is clear that the effects of the present invention cannot be obtained. Furthermore, in the case in which a platinum compound solution that does not form an ammine complex in the platinum compound solution is utilized, it is clear that the effects of the present invention cannot be obtained.

INDUSTRIAL APPLICABILITY

This electrode for hydrogen generation can be utilized in the water or alkali metal chloride aqueous solution electrolysis industries, and it has a sufficiently low hydrogen overvoltage and is not affected by poisoning of iron ions. Furthermore, during the operation or the stop-and-start control, the hydrogen overvoltage does not rise, and exfoliation of the supported material does not occur. Therefore, it is superior in durability. Consequently, it is applicable in electrolysis industries and the like, wherein water or alkali metal chloride aqueous solutions are used.

The invention claimed is:
1. An electrode for hydrogen generation comprising: a conductive base material plate; and a platinum alloy supported on said conductive base material plate,
wherein said platinum alloy consists of platinum and one metal selected from the group consisting of nickel, cobalt, silver, and iron, the platinum content in said platinum alloy is in a range of 0.40 to 0.99 by mole ratio, and a hydrogen overvotage is in a range of 97 mV or less after water electrolysis is performed at a room temperature for 1 week under conditions where an electrolyte of a 32 wt % sodium hydroxide aqueous solution is used, Ni is used as a counter electrode, and a current density is 5 kA/m$^2$.

2. A method for manufacturing an electrode for hydrogen generation according to claim 1, the method comprising:

coating a mixed solution of a metal compound solution including one selected from the group consisting of nickel, cobalt, silver, and iron, and a platinum compound solution which forms an ammine complex, on a conductive base material plate;

drying at a temperature of 200° C. or less;

thermally decomposing at a temperature in a range from more than 200° C. to 700° C. or less; and then subjecting to a reduction processing so as to form a platinum alloy containing platinum at a content in a range of 0.40 to 0.99 by mole ratio on the conductive base material plate.

3. The method for manufacturing an electrode for hydrogen generation according to claim 2, wherein said reduction processing is electrochemical reduction.

4. The method for manufacturing an electrode for hydrogen generation according to claim 2, wherein said reduction processing is electrochemical reduction at the time of electrolysis of a water or an alkali metal chloride aqueous solution.

5. An electrolysis method comprising electrolyzing water or an alkali metal chloride aqueous solution, wherein said electrode for hydrogen generation according to claim 1 is used.

6. The electrode for hydrogen generation according to claim 1, wherein said hydrogen overvotage after said water electrolysis is in a range of 97 to 81 mV.

7. The electrode for hydrogen generation according to claim 1, wherein said one metal is selected from the group consisting of nickel, cobalt, and silver, the platinum content in said platinum alloy is in a range of 0.49 to 0.75 by mole ratio, a hydrogen overvotage is in a range of 98 mV or less during sodium chloride electrolysis testing which is performed by an ion exchange membrane method at 90° C. under conditions where purified brine is supplied to an anode chamber, an aqueous solution containing 6 ppm of iron ions is supplied to a cathode chamber, and a current density is 5 kA/m$^2$.

8. An electrode for hydrogen generation comprising:
a conductive base material plate; and
at least one of an amorphous material and a platinum alloy formed by subjecting said amorphous material to a reduction processing, which is supported on said conductive base material plate, wherein said amorphous material contains platinum and one metal selected from the group consisting of nickel, cobalt, silver, and iron, and said platinum and said metal are evenly distributed, said platinum alloy consists of platinum and one metal selected from the group consisting of nickel, cobalt, silver, and iron, the platinum content in said amorphous material and said platinum alloy is in a range of 0.40 to 0.99 by mole ratio, and a hydrogen overvotage is in a range of 97 mV or less after water electrolysis is performed at a room temperature for 1 week under conditions where an electrolyte of a 32 wt % sodium hydroxide aqueous solution is used, Ni is used as a counter electrode, and a current density is 5 kA/m$^2$.

9. The electrode for hydrogen generation according to claim 8, wherein an X-ray diffraction pattern of said amorphous material is different from that of any one of said platinum alloy of platinum and said one metal selected from the group consisting of nickel, cobalt, silver, and iron, said one metal selected from the group consisting of nickel, cobalt, silver, and iron, and platinum.

10. The electrode for hydrogen generation according to claim 8, wherein said reduction processing is electrochemical reduction.

11. The electrode for hydrogen generation according to claim 8, wherein said reduction processing is electrochemical reduction at the time of electrolysis of a water or an alkali metal chloride aqueous solution.

12. A method for manufacturing an electrode for hydrogen generation according to claim 8, the method comprising:

coating a mixed solution of a metal compound solution including one selected from the group consisting of nickel, cobalt, silver, and iron, and a platinum compound solution which forms an ammine complex, on a conductive base material plate;

drying at a temperature of 200° C. or less; and then thermally decomposing at a temperature in a range from more than 200° C. to 700° C. or less so as to form an amorphous material containing platinum at a content in a range of 0.40 to 0.99 by mole ratio on the conductive base material plate.

13. The electrode for hydrogen generation according to claim 8, wherein said hydrogen overvotage after said water electrolysis is in a range of 97 to 81 mV.

14. The electrode for hydrogen generation according to claim 8, wherein said one metal is selected from the group consisting of nickel, cobalt, and silver, the platinum content in said platinum alloy is in a range of 0.49 to 0.75 by mole ratio, a hydrogen overvotage is in a range of 98 mV or less during sodium chloride electrolysis testing which is performed by an ion exchange membrane method at 90° C. under conditions where purified brine is supplied to an anode chamber, an aqueous solution containing 6 ppm of iron ions is supplied to a cathode chamber, and a current density is 5 kA/m$^2$.

* * * * *